Nov. 18, 1930.      G. W. COOKE      1,781,681
GREASE NOZZLE
Filed Feb. 8, 1928
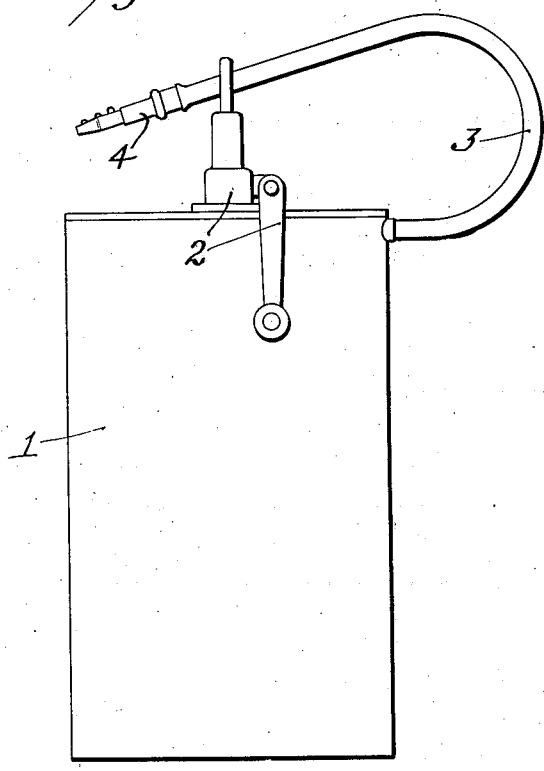
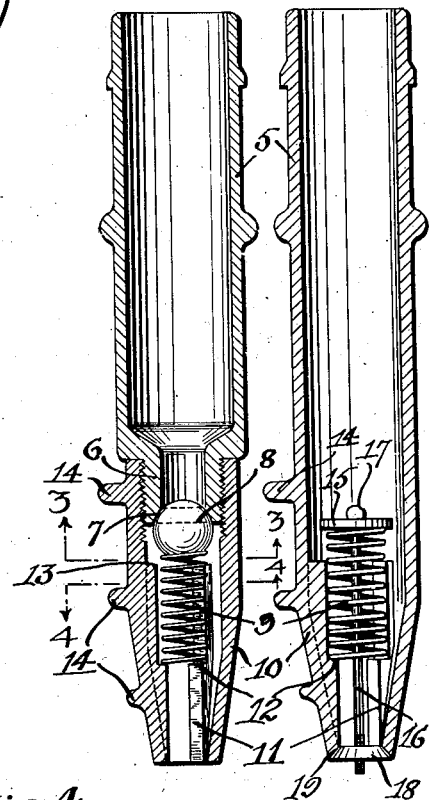
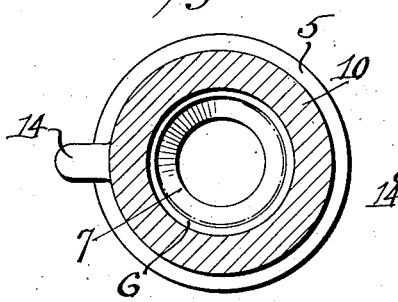
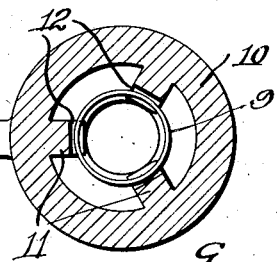
INVENTOR:
George W. Cooke,
BY
Chas. McC. Chapman,
ATTORNEY.

Patented Nov. 18, 1930

1,781,681

UNITED STATES PATENT OFFICE

GEORGE W. COOKE, OF FOREST HILLS, NEW YORK, ASSIGNOR, BY MESNE ASSIGNMENTS, TO ALLIED DIE-CASTING CORPORATION, OF LONG ISLAND CITY, NEW YORK, A CORPORATION

GREASE NOZZLE

Application filed February 8, 1928. Serial No. 252,802.

This invention relates to oil and grease nozzles, and particularly has reference to self-sealing, non-drip and non-waste nozzles for oil and grease, for use in oiling and greasing systems usually employed for many purposes in and about road vehicles and industrial machinery.

Among the objects of my invention may be noted the following: to provide a self-closing or locking grease nozzle so constructed as to prevent leakage or seepage of oil and grease from the nozzle when the system is not in use; to provide a self-locking grease nozzle which is strong, durable, economical to produce, certain in action when lubricating the various parts of a motor vehicle, or machinery of various kinds, and capable of being used in many relations for lubricating and cleaning purposes; to provide a nozzle of the kind noted in the foregoing having a valve which cannot be unseated by the usual pressure existing in the conduit after a functional operation, or when not in greasing operation; and to provide a simple structure in which the parts can be quickly and easily assembled and dissociated when required for repairs, cleansing or other purposes.

With the above objects in view and others which will be detailed during the course of this description, my invention consists in the parts, features, elements and combinations thereof hereinafter described and claimed.

In order that my invention may be clearly understood, I have provided drawings wherein:

Figure 1 is a view showing a grease or oil drum in side elevation, with my improved nozzle applied thereto;

Figure 2 is a longitudinal sectional view showing a two-part nozzle for lubricating purposes with my invention applied thereto;

Figure 3 is a view taken in section along the line 3—3 of Figure 2;

Figure 4 is a view taken in section along the line 4—4 of Figure 2; and

Figure 5 is a view similar to Figure 2 showing my invention, in another form, applied to a one-piece nozzle.

Referring to the drawings, the numeral 1 indicates a grease or oil drum having a usual pumping means 2, a flexible hose 3 and a nozzle 4 shown conventionally; but, which may be either of the forms shown in the remaining figures of drawing.

Referring to Figures 2, 3 and 4, the nozzle is made in two parts, the upper or body part 5 having at its outer end a reduced externally screw-threaded member 6 having at its outer end a beveled portion 7 forming a seat for the ball-valve 8 sustained in the position shown in Figure 2 by a coiled expansion spring 9 the tension of which is sufficient to prevent unseating the ball-valve due to pressure in the conduit after a functional operation. The spring is seated in a detachable outer member 10 which is in the form of a truncated cone at its outer end, and which at its inner end is internally screw-threaded to cooperate with the threaded member 6 of the body portion 5. The interior of the member 10 is provided with a plurality of vanes or ribs 11 extending lengthwise thereof and projecting toward each other relatively to the axis of the nozzle, there being preferably three of such vanes which surround the spring 9 and which are provided midway of their length with seats or shoulders 12 for supporting the spring 9. The length of the spring is sufficient, together with its tension, to hold the ball 8 firmly against its seat at the outer end of the member 6. The vanes 11, at their inner ends, afford supports 13 for the ball-valve 8 when the latter is under pressure during operation of the nozzle, provided the pressure is sufficient to compress the spring to an extent to allow the ball to contact with said supports. Thus the vanes have a triple function, viz.: to provide shoulders for the support of the spring, supports or limiting means for the ball 8, and to provide, in combination with the end of the member 6, a chamber in which the ball may operate.

In assembling, the spring is slipped into the tip 10 between the vanes 11, the ball is placed upon the end of the spring, and the body member 5 is screwed to the limit into the inner end of the tip 10. The nozzle may then be applied to the hose in any usual manner.

It is desirable to apply, to the outside of the nozzle, a plurality of projections, which may be of any desired form, as indicated at 14, for the purpose of preventing the nozzle, when applied for lubricating purposes, from slipping away from the apparatus into which the nozzle has been inserted. The projections 14 may be as numerous and extensive as desired, and may be given any suitable shape.

In the form of my invention shown in Figure 5, the body 5 and the tip-end are formed or cast integral. The interior of the tip is provided with vanes and seats for the spring, the same as in the construction of Figure 2, and said similiar parts are indicated by like reference characters. In this form of my invention, the spring is considerably longer, may be heavier, and at its upper end has a cap 15 applied thereto through which and through the spring is extended a rod or bar 16, the outer end of which is headed, as at 17, to prevent the cap from being shifted therefrom. The lower end of the rod 16 is provided with a conical valve 18, which seats against the beveled outer end 19 of the tip 10. The length of the rod 16 is sufficient to permit of considerable adjustment of the tension of the spring 9, whereby the valve 18 is firmly and properly held against its seat 19. In assembling the parts of this form of my invention, the spring, cap and rod may be dropped into position from the inner end of the nozzle 5. The valve will then be screwed upon the rod until sufficient tension has been established to enable the spring to firmly hold the valve against its seat.

In all the forms of my invention, it will be readily seen that pressure within the nozzle will unseat the valves; that the springs cannot be sufficiently compressed to retard the passage of the lubricant; that, in any event, the lubricant can pass through the center of the springs, laterally between their coils, and has, in consequence, free and unimpeded passage through the nozzle; and that the lubricant has free passage around the body of the springs, and in the form of Figures 2 and 5 has free passage between the ribs or vanes, thus avoiding any possibility of congestion of the lubricant within the tip or any retardation to the passage of the lubricant through the nozzle. On the other hand, when the nozzle is not in use, residue of internal pressure in the system cannot unseat the valve; and the tension of the spring and the cooperative structure are such as to prevent leakage of lubricant around the valve. Therefore, the nozzle can be laid down anywhere, hung up in warm places, and carelessly disposed without fear of soiling floors, benches or other places or things in service stations or garages. This is particularly true of the structure of Figure 5.

Having thus described my invention, what I claim and desire to secure by Letters Patent is:

1. A lubricating nozzle having between its ends a valve-seat, a valve, a spring holding the valve to its seat, a plurality of ribs surrounding said spring for sustaining the same and forming passages for lubricant whereby, under pressure of the grease passing through the nozzle, the valve is unseated and the spring is compressed without obstructing the passage through the nozzle.

2. A lubricating nozzle having at its delivery end within its bore a plurality of radial ribs or vanes forming passages for the lubricant, a spring enclosed by said vanes and supported thereon, a valve for closing the passage through the nozzle, the valve being supported by the spring so as to close the passage through the nozzle.

3. A lubricating nozzle having its delivery end provided with a bore, a plurality of parallel ribs in its delivery end for greatly reducing the diameter thereof as compared with the passage through the remainder of the nozzle, the delivery end having a valve-seat and a valve cooperating therewith, a spring for holding the valve to its seat, said spring being housed by the reduced bore of the delivery end, and means for supporting the spring in the latter.

4. A lubricating nozzle composed of two parts having between them a chamber at one side of which is a valve-seat, a valve cooperating with the seat and operating within the chamber under spring control, the chamber having means opposed to the valve-seat for limiting the movement of the valve.

5. A lubricating nozzle comprising a body member having a reduced externally threaded terminal and a tip threaded on said terminal forming means for detachably connecting the two, said terminal being formed to provide a valve-seat, a valve chamber formed in said tip, a valve in said chamber cooperating with said seat, and a spring held in the chamber of said tip for supporting the valve against its seat.

6. A lubricating nozzle comprising a body member having a tip at its outer end, said tip portion having a plurality of parallel ribs providing passages between them, said ribs being shouldered to form a seat, a spring mounted on said seat, and a valve for closing the passages through the nozzle held to its work by said spring.

GEORGE W. COOKE.